(12) United States Patent
Öhrn et al.

(10) Patent No.: US 10,382,780 B2
(45) Date of Patent: Aug. 13, 2019

(54) METHOD, A VIDEO ENCODER, AND A VIDEO CAMERA FOR ENCODING A VIDEO STREAM

(71) Applicant: Axis AB, Lund (SE)

(72) Inventors: Anton Öhrn, Lund (SE); Viktor Edpalm, Lund (SE); Henrik Eliasson, Lund (SE); Björn Benderius, Lund (SE); Niclas Svensson, Lund (SE); Xing Danielsson Fan, Lund (SE); Fredrik Pihl, Lund (SE)

(73) Assignee: Axis AB, Lund (SE)

( * ) Notice: Subject to any disclaimer, the term of this patent is extended or adjusted under 35 U.S.C. 154(b) by 3 days.

(21) Appl. No.: 15/928,798

(22) Filed: Mar. 22, 2018

(65) Prior Publication Data
US 2018/0278953 A1    Sep. 27, 2018

(30) Foreign Application Priority Data

Mar. 24, 2017 (EP) .................................... 17162801

(51) Int. Cl.
*H04N 19/117* (2014.01)
*H04N 19/137* (2014.01)
(Continued)

(52) U.S. Cl.
CPC ........... *H04N 19/55* (2014.11); *H04N 19/117* (2014.11); *H04N 19/137* (2014.11);
(Continued)

(58) Field of Classification Search
CPC .... H04N 19/55; H04N 19/503; H04N 19/117; H04N 19/176; H04N 19/159; H04N 19/137; H04N 19/182; H04N 19/593
See application file for complete search history.

(56) References Cited

U.S. PATENT DOCUMENTS

| 5,550,595 A | 8/1996 | Hannah |
| 2003/0091232 A1 | 5/2003 | Kalevo et al. |

(Continued)

FOREIGN PATENT DOCUMENTS

| CN | 1558680 A | 12/2004 |
| CN | 102164278 B | 5/2013 |

(Continued)

OTHER PUBLICATIONS

Extended European Search Report dated May 17, 2017 for the European Application No. 17162802.7.
(Continued)

*Primary Examiner* — Alison Slater
(74) *Attorney, Agent, or Firm* — Volpe and Koenig, P.C.

(57) ABSTRACT

A method of encoding a video stream comprising receiving a frame of a video stream to be encoded, performing motion detection in the frame to identify steady regions, and temporally filtering the frame so as to provide temporally filtered pixel values. For a pixel in the steady regions of the frame, the temporally filtered pixel value is used when encoding the pixel, on a condition that the pixel belongs to a block of pixels of the frame that will be intra-coded. On a condition that the pixel instead belongs to a block of pixels of the frame that will be inter-coded, a value that was used when encoding a corresponding pixel of the immediately preceding frame is used when encoding the pixel.

11 Claims, 4 Drawing Sheets

(51) Int. Cl.
    *H04N 19/107*    (2014.01)
    *H04N 19/55*     (2014.01)
    *H04N 19/593*    (2014.01)
    *H04N 19/182*    (2014.01)
    *H04N 19/503*    (2014.01)
    *H04N 19/159*    (2014.01)
    *H04N 19/176*    (2014.01)

(52) U.S. Cl.
    CPC ......... *H04N 19/159* (2014.11); *H04N 19/176* (2014.11); *H04N 19/182* (2014.11); *H04N 19/503* (2014.11); *H04N 19/593* (2014.11)

(56) References Cited

U.S. PATENT DOCUMENTS

| | | |
|---|---|---|
| 2003/0161407 A1 | 8/2003 | Murdock et al. |
| 2007/0064815 A1 | 3/2007 | Alvarez et al. |
| 2007/0183512 A1 | 8/2007 | Li et al. |
| 2009/0110078 A1 | 4/2009 | Crinon |
| 2009/0244319 A1 | 10/2009 | Kim et al. |
| 2010/0177246 A1 | 7/2010 | Yong et al. |
| 2011/0249133 A1 | 10/2011 | Zhou et al. |
| 2011/0293014 A1 | 12/2011 | Nakagami et al. |
| 2013/0002898 A1 | 1/2013 | Tian et al. |
| 2013/0027581 A1 | 1/2013 | Price et al. |
| 2013/0106984 A1 | 5/2013 | Wu et al. |
| 2014/0177717 A1 | 6/2014 | Li et al. |
| 2016/0112707 A1 | 4/2016 | Diefenbaugh et al. |
| 2016/0125618 A1 | 5/2016 | Johansson et al. |
| 2018/0152606 A1 | 5/2018 | Edpalm |
| 2018/0220129 A1* | 8/2018 | Peng .................... H04N 19/117 |
| 2018/0262754 A1* | 9/2018 | Komi .................... H04N 19/139 |

FOREIGN PATENT DOCUMENTS

| | | |
|---|---|---|
| JP | 2014-036357 A | 2/2014 |
| JP | 2015-023498 A | 2/2015 |
| WO | 2008/054978 A1 | 5/2008 |
| WO | 2008/075261 A1 | 6/2008 |

OTHER PUBLICATIONS

Extended European Search Report dated Oct. 2, 2017 for the European Application No. 17162801.9.

Stankiewicz et al., "Temporal noise reduction for preprocessing of video streams in monitoring systems," (2000).

\* cited by examiner

METHOD, A VIDEO ENCODER, AND A VIDEO CAMERA FOR ENCODING A VIDEO STREAM

FIELD OF INVENTION

The present teachings relate to the field of video encoding. In particular, it relates to a method, a video encoder, and a video camera for encoding a video stream.

BACKGROUND

The use of video cameras is growing more popular every day. One application of video cameras is for surveillance. For example, a network of video camera may be arranged to monitor a scene. The video streams captured by the video cameras are typically encoded in the video cameras prior to being transmitted to another node in the network, such as a server or a client.

Video coding is usually subject to a trade-off between the bitrate of the stream of encoded video on the one hand, and the quality of the encoded video on the other hand. In a camera system, like the one described above, the video stream captured by a video camera is usually degraded by noise. Since the noise is expensive to code, without contributing to the quality of the video, the video stream is therefore preferably subject to noise filtering prior to encoding. Since modern codecs, such as codecs implementing the H.264 or H.265 standard, are much more sensitive to temporal noise than spatial noise, it is common practice to apply a temporal noise filter before encoding the video stream.

When there is no movement in the scene, temporal noise filtering is very effective in reducing the noise without introducing artefacts. For example, consider the situation where there is no movement in the scene between two consecutive frames of the video stream. In such a situation, the temporal noise is the only difference between the same pixel in the current and the previous frame, and a temporal filter will be efficient to reduce the noise without introducing artefacts. However, even if the temporal noise is reduced in such a pixel, there will still be fluctuations in the pixel value between consecutive frames of the video stream. These fluctuations contribute to the output bitrate in an undesired manner. In particular, temporal fluctuations in pixel values affect the encoding cost of inter-coded blocks. In more detail, if a pixel belongs to a block of pixels of the frame that will be inter-coded, i.e., where the encoding relies on predicting the value in the pixel from a previous frame, there will be a cost for encoding the pixel value as long as the pixel value has changed its value from the previous frame. However, if the pixel value instead had remained constant in relation to the previous frame, the pixel could have been encoded at no cost by merely referring to the pixel value of the previous frame. There is thus room for improvements.

SUMMARY

In view of the above, it is thus an object of the present disclosure to provide an encoding method which further reduces the bitrate of the encoded video stream.

According to a first aspect, the above object is achieved by a method of encoding a video stream, comprising: receiving a frame of a video stream to be encoded, performing motion detection in the frame to identifying steady regions, wherein the steady regions are regions in the frame where no motion is detected, temporally filtering the frame so as to provide a temporally filtered pixel value for each pixel in the frame, for each pixel in the steady regions of the frame: on a condition that the pixel belongs to a block of pixels of the frame that will be intra-coded, using the temporally filtered pixel value when encoding the pixel, on a condition that the pixel belongs to a block of pixels of the frame that will be inter-coded, using a value that was used when encoding a corresponding pixel of an immediately preceding frame when encoding the pixel.

The proposed method is based on the realization that the bitrate may be reduced by removing the temporal fluctuation of pixel values, caused by noise, in pixels for which no motion is detected. In particular, if a pixel belongs to a steady region of the frame and the pixel belongs to a block of pixels that will be inter-coded, the value that was used when encoding the corresponding pixel in the preceding frame is used when encoding the pixel. As a result, the pixel may be inter-coded at no or little cost by merely referring back to the corresponding pixel of the preceding frame. Thus, as long as no motion occurs in a pixel, and as long as the pixel belongs to a block that will be inter-coded, the pixel value that is used by the encoder is "frozen", i.e., kept at a constant level. The constant level is updated each time the pixel belongs to a block that will be intra-coded, and corresponds to the temporally filtered pixel value at that time. In this way, the inter-coded blocks will be much cheaper, since the temporal fluctuation between frames is removed, and the cost for the intra-coded blocks will remain the same. At the same time the image quality is not much compromised.

By an immediately preceding frame is meant a frame that immediately precedes another frame, i.e., there is no other frame in between two frames. In the following, for simplicity, the terms preceding frame and immediately preceding frame will be used interchangeably.

By a temporally filtered pixel value is meant an output value of a temporal filter to which the pixel value is input.

Two pixels are said to be corresponding if they have the same pixel location albeit in different frames of the video stream.

When encoding a sequence of video frames, it is common practice to divide each video frame into blocks of pixels, such as blocks of 16×16 pixels, 32×32 pixels, or 64×64 pixels depending on the coding standard used, and encode the frame block-by-block. These blocks are known as macroblocks in H.264/MPEG-4 AVC, and coding units in H.265/HEVC. Thus, by a block of pixels of a frame as used herein is generally meant a macroblock as known from H.264/MPEG-4 AVC or a coding unit as known from H.265/HEVC.

The blocks may be encoded as intra-blocks, sometimes referred to as I-blocks, or as inter-blocks, sometimes referred to as P- or B-blocks. If a block is intra-coded, the pixel values are encoded with reference to the current frame only, such as by extrapolating from the edges of neighboring blocks in the same frame. This is in contrast to inter-coded blocks, which are encoded with reference to a block of pixels in a reference frame (which may correspond to a previous frame in the video stream) by carrying out motion compensation.

The method may further comprise, for pixels which are not in the steady regions of the frame, using the temporally filtered pixel value when encoding the pixel. Thus, as a default, the temporally filtered pixel value is used when encoding a pixel. However, on a condition that the pixel belongs to a steady region, and, additionally, on a condition that the pixel belongs to a block that will be inter-coded, the value that was used when encoding the preceding frame is used.

The above method presupposes that it is known beforehand, i.e., pre-encoding, which blocks of pixels in the frame that will be inter-coded and which blocks of pixels that will be intra-coded. For that purpose, the method may further comprise receiving information indicating whether a block of pixels of the frame will be intra-coded or inter-coded. Based on the received information, a decision may be taken as to which value to use when encoding a pixel, i.e., whether the temporally filtered value or the value that was used when encoding the corresponding pixel of the previous frame should be used.

Known video coding techniques, such as H.264 and H.265, use inter-frame prediction to reduce video data between a series of frames. This involves techniques such as block-based motion compensation, where a new frame can be predicted block-by-block by looking for a matching block in a reference frame. With inter-frame prediction, each frame is classified as a certain type of frame, such as an intra-frame (sometimes referred to as an I-frame, e.g., in H.264) or an inter-frame (sometimes referred to as a P-frame or B-frame, e.g., in H.264). An intra-frame is a self-contained frame that can be independently decoded without reference to any other frames. This is in contrast to an inter-frame which make reference to one or more previously decoded frames. The intra-frames and the inter-frames are arranged in a certain order in the video stream as defined by a group of pictures (GOP) structure. An intra-frame indicates the beginning of a GOP structure, and thereafter several inter-frames follow.

The received information may include a group of pictures, GOP, structure that identifies which frames in the video stream that will be encoded as intra-frames and which frames in the video stream that will be encoded as inter-frames, wherein all blocks of pixels in an intra-frame will be intra-coded. The received GOP structure may hence be used to deduce whether the current frame is an intra-frame or an inter-frame.

As mentioned above, all blocks of pixels of an intra-frame are intra-coded. In some embodiments, all blocks of pixels of an inter-frame are inter-encoded. However, in other embodiments, some blocks of pixels of an inter-frame are intra-coded while the other blocks of pixels of an inter-frame are inter-coded. In this way, a new point of reference, in terms of an intra-coded block may be set also in between intra-frames. This is sometimes referred to as "intra-refresh". In particular, there may be a predetermined pattern which identify the blocks of pixels of an inter-frame that will be intra-coded. The received information may include such a pattern. More specifically, the information may further include a pattern identifying which blocks of pixels of the inter-frames of the GOP structure that will be intra-coded and which blocks of pixels of the inter-frames of the GOP structure that will be inter-coded. From the received GOP structure, and the received pattern, it may hence be determined whether a block of pixels in a frame will be inter- or intra-coded.

The GOP structure, and the pattern referred to above, are examples of predetermined structures that may be used to predict whether a frame or a block of pixels will be intra- or intra-coded. However, there may also be other reasons for encoding a frame as an intra-frame or an inter-frame. For example, as the encoded video stream is transmitted from the encoder over a network, some frames may be lost, i.e., they will never reach the recipient. If this happens, it may be necessary to "re-start" the encoding by encoding a new intra-frame, regardless whether or not an intra-frame is scheduled by the GOP structure. The encoding of a new intra-frame may be made upon request, e.g., upon request by a network interface. The received information may thus include a request that the frame is encoded as an intra-frame.

In some embodiments, an additional check may be carried out prior to encoding the pixel using the pixel value that was used when encoding the previous frame. More specifically, if the temporally filtered value deviates too much from the pixel value that was used when encoding the corresponding pixel of the previous frame, the image quality may be compromised. If that is the case, it may be preferred to instead use the temporally filtered pixel value when encoding the pixel. In more detail, the method may further comprise: for each pixel in the steady regions of the frame: comparing the temporally filtered pixel value to the value that was used when encoding a corresponding pixel of the immediately preceding frame, on a condition that the temporally filtered pixel value differs from the value that was used when encoding a corresponding pixel of the immediately preceding frame by more than a threshold value, using the temporally filtered pixel value when encoding the pixel even if the pixel belongs to a block of pixels of the frame that will be inter-coded.

The method may further comprise storing the temporally filtered pixel value and the value used when encoding the pixel. In this way, the temporally filtered pixel value and the value used when encoding the pixel may be used when processing the next frame.

The step of temporally filtering the frame may comprise updating, for each pixel in the frame, a temporally filtered pixel value that was calculated with respect to the immediately preceding frame of the video stream, wherein the temporally filtered pixel value that was calculated with respect to the immediately preceding frame is updated by combining it with a value of the pixel of the frame. In this way, only the temporally filtered pixel value for the immediately previous frame needs to be stored for the purpose of carrying out the temporal filtration and not the full temporal history of the pixel.

The temporally filtered pixel value that was calculated with respect to the immediately preceding frame may be updated by forming a weighted average of the temporally filtered pixel value that was calculated with respect to the immediately preceding frame and the value of the pixel of the frame.

By updating the previously calculated temporally filtered pixel value in this way, the temporally filtered pixel value will correspond to an accumulation of not only the immediately preceding frame, but also the frames before that.

The weights may be dependent on a probability, determined in the motion detection step, that the pixel belongs to a steady region. The lower the probability, the lower is the relative weight of the temporally filtered pixel value, and the higher is the relative weight of the value of the pixel of the frame.

According to a second aspect, the above object is achieved by a video encoder, comprising: a receiver configured to receive a frame of a video stream to be encoded, a motion detector configured to perform motion detection in the frame to identifying steady regions, wherein the steady regions are regions in the frame where no motion is detected, a temporal filter configured to temporally filter the frame so as to provide a temporally filtered pixel value for each pixel in the frame, an encoder configured to, for each pixel in the steady regions of the frame, use the temporally filtered pixel value when encoding the pixel on a condition that the pixel belongs to a block of pixels of the frame that will be intra-coded by the encoder, and to use a value that was used when encoding a corresponding pixel of an immediately preceding frame when encoding the pixel on a condition that the pixel belongs to a block of pixels of the frame that will be inter-coded by the encoder.

According to a third aspect, the above object is achieved by a video camera comprising a video encoder according to the second aspect.

According to a fourth aspect, the above object is achieved by a non-transitory computer-readable medium having computer-code instructions stored thereon which, when executed by a device having processing capability, are adapted to perform the method according to the first aspect.

The second, third, and fourth aspects may generally have the same features and advantages as the first aspect. It is further noted that the present teachings relate to all possible combinations of features unless explicitly stated otherwise.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The systems and devices disclosed herein will be described during operation.

Figure 1:
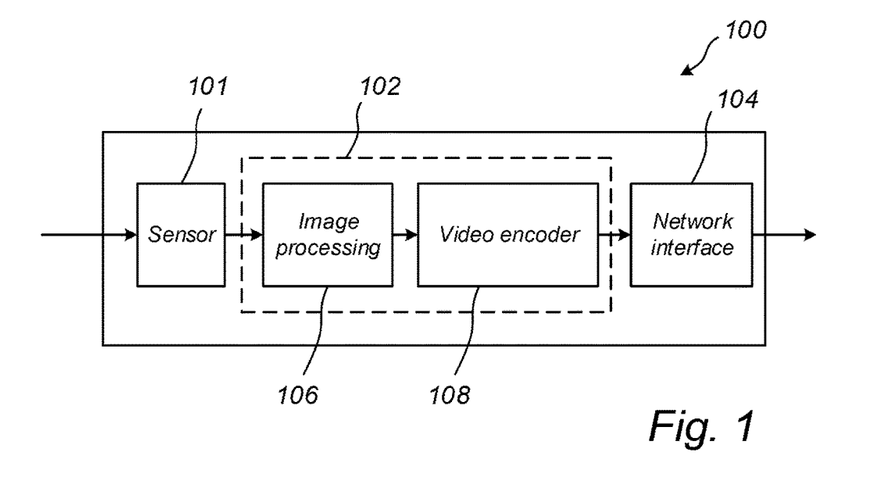
FIG. 1 illustrates a video camera according to embodiments.

FIG. 1 illustrates the video camera 100. The video camera 100 comprises a sensor 101, an image pipeline 102, and a network interface 104. The image pipeline 102 has an image processing portion 106 and a video encoder 108 arranged downstream of the image processing portion 106. The general structure of the video camera 100 is thus conventional. However, the video camera 100 differs from conventional video cameras in the internal structure and functionality of the video encoder 108.

The video camera 100 is, via sensor 101, arranged to capture a video stream of consecutive frames. The frames are passed through the image pipeline 102 where they are processed by the image processing portion 106 and the video encoder 108. The encoded video stream, i.e., the sequence of encoded frames, that is output from the video encoder 108 may then via the network interface 104 be transmitted as a bitstream over a network, e.g., to a video decoder.

Figure 2:
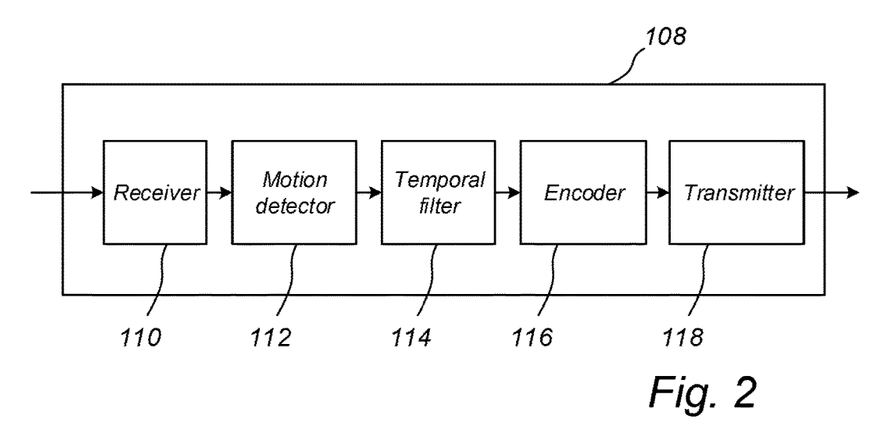
FIG. 2 illustrates a video encoder according to embodiments.

FIG. 2 illustrates the video encoder 108 in more detail. The video encoder comprises a receiver 110, a motion detector 112, a temporal filter 114, an encoder 116, and a transmitter 118.

The video encoder 108, and particularly the encoder 116, typically uses inter-frame prediction, such as defined by the standard H.264 or H.265, to reduce video data between a series of frames. With inter-frame prediction, each frame is classified as a certain type of frame, such as an intra-frame (sometimes referred to as an I-frame, e.g., in H.264) or an inter-frame (sometimes referred to as a P-frame or B-frame, e.g., in H.264). An intra-frame is a self-contained frame that can be independently decoded without any reference to other images. In particular, when encoding intra-frames, the luminance and chrominance channels are encoded by exploiting the spatial redundancy of the pixels in a given channel of a single frame via prediction, transform, and entropy coding. This is in contrast to an inter-frame which makes references to parts of an earlier intra-frame and/or inter-frame(s) to code the frame. When encoding inter-frames, temporal redundancy between separate frames is exploited, and the encoding relies on a motion-compensation prediction technique that predicts parts of a frame from one or more previous frames by encoding the motion in pixels from one frame to another for selected blocks of pixels.

The video encoder 108 thus comprises various components 110, 112, 114, 116, 118 which are configured to implement the functionality of the video encoder 108. Generally, the video encoder 108 may comprise circuitry which is configured to implement the components 110, 112, 114, 116, 118 and, more specifically, their functionality.

In a hardware implementation, each of the components 110, 112, 114, 116, 118 may correspond to circuitry which is dedicated and specifically designed to provide the functionality of the component. The circuitry may be in the form of one or more integrated circuits, such as one or more application specific integrated circuits. By way of example, the temporal filter 114 may thus comprise circuitry which, when in use, temporally filters the frames in the received video stream.

In a software implementation, the circuitry may instead be in the form of a processor, such as a microprocessor, which in association with computer code instructions stored on a (non-transitory) computer-readable medium, such as a non-volatile memory, causes the video encoder 108 to carry out any method disclosed herein. In that case, the components 110, 112, 114, 116, 118 may thus each correspond to a portion of computer code instructions stored on the computer-readable medium, that, when executed by the processor, causes the video encoder 108 to carry out the functionality of the component.

It is to be understood that it is also possible to have a combination of a hardware and a software implementation, meaning that the functionality of some of the components 110, 112, 114, 116, 118 are implemented in hardware and others in software.

The operation of the video encoder 108 will now be described with reference to FIGS. 2, 3 and the flowchart of FIG. 4.

In step S02, the receiver 110 receives a frame of the video stream to be encoded.

In step S04, the motion detector 112 performs motion detection in the frame. The purpose of the motion detection is to identify steady regions in the frame, i.e., regions of the frame where no motion takes place. Any known motion detection algorithm may be used for this purpose.

A simple motion detection algorithm may calculate a difference between a measured pixel value in a current frame to a measured pixel value of a corresponding pixel in the preceding frame. If the difference is larger than a threshold, it is determined that there is motion in the pixel. Otherwise it is determined that there is no motion in the pixel, i.e., that the pixel belongs to a steady region. More advanced motion detection algorithms will rather look at a group of pixels at a time to get a more reliable result.

In step S06, the frame is input to a temporal filter 114 which temporally filters the frame. In principle, the temporal filter 114 may implement any known temporal filtration method. Preferably, however, the temporal filter 114 is implemented such that it only needs access to the pixel values of the current frame, and the temporally filtered pixel values of the preceding frame. In this way, the amount of data that needs to be stored may be reduced. For example, the temporal filter 114 may, for each pixel position, update the temporally filtered pixel value of the preceding frame on basis of the pixel value of the current frame, e.g., by combining the temporally filtered pixel value of the preceding frame with the pixel value of the current frame. The updated temporally filtered pixel value may then be stored in order to be used when the following frames are processed. This is further illustrated in FIG. 3.

Figure 3:
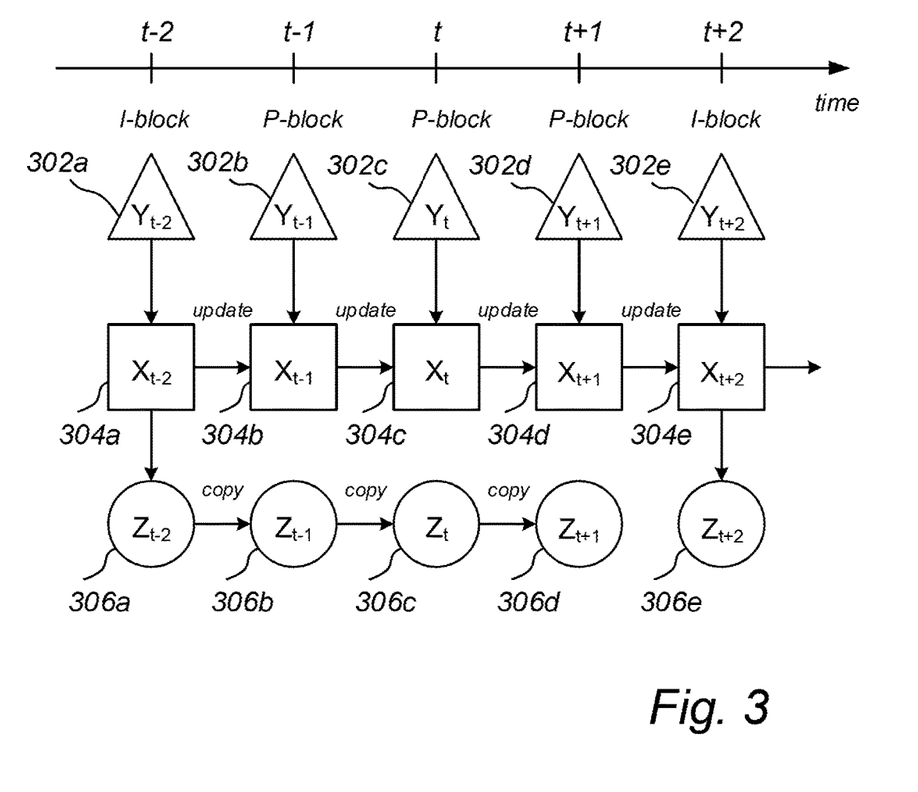
FIG. 3 illustrates measured pixel values, temporally filtered pixel values, and encoded pixel values for a specific pixel location of a video stream.

FIG. 3 schematically illustrates, inter alia, measured pixel values 302a-e (the triangles) and temporally filtered pixel values 304a-e (the squares) for a specific pixel location in the video stream as a function of time. It is assumed that the video stream is initiated at time t−2. The temporally filtered pixel value 304a at time t−2 is initially set to be equal to the measured pixel value 302a at time t−2. When a new frame, corresponding to time t−1 is received, the temporally filtered pixel value 304a from the preceding frame is updated by combining it with the pixel value 302b measured at time t−1. The so obtained updated temporally filtered pixel value 304b is stored for future use. For example, a weighted sum of the temporally filtered pixel value 304a from the preceding frame and the pixel value 302b of the current frame may be calculated according to:

$$X_{t-1} = aX_{t-2} + (1-a)Y_{t-1},$$

where $X_{t-1}$ denotes the temporally filtered pixel value updated at time t−1 (i.e., item 304b), e $X_{t-2}$, denotes the temporally filtered pixel value that was calculated at time t−2 (i.e., item 304a), and $Y_{t-1}$ denotes the measured pixel value at time t−1 (i.e., item 302b). "a" is a parameter that determines how to mix the measured pixel value 302b and the temporally filtered pixel value 304a from the previous frame. The value of the parameter a may be temporally constant. However, it may also vary temporally. Specifically, it may be based on information from the motion detector 112 indicating the probability that there is motion in the pixel.

The temporal filter 114 repeats the above described procedure each time a new frame is received. Thus, at time t, the temporally filtered pixel value 304c is calculated as a combination of the temporally filtered pixel value 304b and the measured pixel value 302c, and so on.

The next step of the method is to encode the frame by the encoder 116. However, the encoder 116 will use different input values with respect to a pixel of the frame depending on if motion has been detected in the pixel, and depending on whether the pixel belongs to a block of pixels that will be intra-coded or inter-coded. This will be described in the following.

In step S08, the encoder 116 checks, for each pixel in the frame, whether motion was detected in the pixel by motion detector 112 in step S04. For those pixels where motion was detected, i.e., for those pixels which are not in a steady region of the frame, the encoder 116 will, in step S12, use the temporally filtered pixel values when encoding the pixels.

If the encoder 116 in step S08 instead finds that no motion was detected in a pixel by the motion detector 112 in step S04, i.e., the pixel belongs to a steady region, the encoder 116 proceeds to step S10.

In step S10, which is carried out for each pixel in the steady regions of the frame, the encoder 116 checks whether the pixel belongs to a block of pixels of the frame that will be intra-coded. To carry out this check, the encoder 116 may have access to, or receive, information which indicates whether a block of pixels will be intra-coded or inter-coded. This information may be stored in a memory of the video encoder 116. For example, the video encoder 108 may have access to a group of pixels, GOP, structure defining the order in which intra- and inter-frames are arranged in the video stream. All blocks of pixels in an intra-frame are intra-coded, i.e., coded without referring to another frame. However, the same is not necessarily true for an inter-frame, i.e., all blocks of pixels of an inter-frame are not necessarily inter-coded. In some cases, it is determined beforehand which blocks of an inter-frame that will be intra-coded. For example, there may be a pattern, sometimes referred to as an intra-refresh pattern, that identifies which blocks of an inter-frame that will be intra-coded. The video encoder 108, and more specifically the encoder 116, may have access to or receive this pattern. On basis of that pattern, the encoder 116 may thus deduce which blocks of the frame that will be encoded as intra-blocks and inter-blocks.

Alternatively, or additionally, the video encoder 116 may receive a request from the network interface 104 to encode the frame as an intra-frame. This may for instance be the case if a frame was lost in the transmission and the encoding needs to be re-started by encoding an intra-frame.

It is to be noted that the decision in step S10 is based on information which is available pre-encoding. Thus, if a block is to be inter-coded according to information which is available pre-encoding, and the encoder 116 for some reason later on during the encoding process decides to intra-code the block instead, the outcome of step S10 is still that the block is to be inter-coded.

If the encoder 116, in step S10, finds that a pixel belongs to a block that will be intra-coded, the encoder 116 uses the temporally filtered pixel value from step S06 when encoding the pixel, see step S12.

If the encoder 116, in step S10, instead finds that a pixel belongs to a block that will be inter-coded, the encoder 116 uses the value that was used when encoding a corresponding pixel of the preceding frame when encoding the pixel, step S14. Either way, the value that is used by the encoder 116 when encoding is stored for future use.

The above is further illustrated in the example of FIG. 3. In the example of FIG. 3, it is assumed that the exemplified pixel location belongs to a steady region of the frame, i.e., that no motion is detected in the pixel by the motion detector 112 in step S08 during the illustrated time interval. The circles 306a e illustrate the values that are used by the encoder 116 when encoding the pixel at the different points in time. These values are also denoted by $Z_{t-2}, \ldots, Z_{t+2}$ in FIG. 3.

As further discussed above, the video stream is initiated at time t−2. The first frame of the video stream is encoded as an intra-frame, i.e., all blocks of the frame are intra-coded. The pixel, at time t−2, thus belongs to a block that will be intra-coded. The label "I-block" at time t 2 indicates that the block is an intra-block, where I-block is a term used in, e.g., H.264 for an intra-coded block. Following steps S10 and S12, at time t−2, the value 306a used by the encoder 116 when encoding the pixel is set to the temporally filtered pixel value 304a, i.e., $Z_{t-2} = X_{t-2}$ in FIG. 3.

At time t−1, the pixel belongs to a block that will be inter-coded, as indicated by the label "P-block". P-block is a term used for an inter-coded block in, e.g., H.264. Following steps S10 and S14, at time t−1, the value 306b used by the encoder 116 when encoding the pixel is the value that was used when encoding the same pixel in the previous frame, i.e., the value 306a. In other words, $Z_{t−1}=Z_{t−2}$. The encoder 116 will thus copy the value used when encoding the previous frame.

At time t, the pixel again belongs to a block that will be inter coded, as indicated by the label "P-block". Thus, following steps S10 and S14, the value 306c used by the encoder 116 when encoding the pixel is the value 306b that was used when encoding the same pixel in the previous frame, i.e., $Z_t=Z_{t−1}$.

The same thing is repeated at time t+1, for the same reasons, and $Z_{t+1}=Z_t$.

In the next frame, i.e., at time t+2, the pixel instead belongs to a block that will be intra-coded, as indicated by the label "I-block" at time t+2. Following steps S10 and S12, at time t+2, the value 306e used the encoder 116 when encoding the pixel is the temporally filtered pixel value 304e as updated at time t+2, i.e., $Z_{t+2}=X_{t+2}$.

Looking at the whole temporal sequence, the value used by the encoder 116 when encoding the pixel remains constant at times t−2, t−1, t, t+1, and is equal to the temporally filtered pixel value $X_{t−2}$ from time t−2. The value used by the encoder 116 is hence frozen at the level of the output of the temporal filter 114 at time t−2. The value remains frozen until the next time the pixel is included in an intra-coded block, in this case at time t+2. At that time, the value used by the encoder 116 is set to the output of the temporal filter 114 at time t+2. At time t+2, the value used by the encoder 116 is hence frozen again until the next time the pixel belongs to an intra-coded block, this time at the level of the output of the temporal filter 114 at time t+2. Since the value in the pixel remains constant during inter-coding, the encoder 116 may encode the pixel by merely referring to the value in the previous frame. Thus, the output bitrate of the encoder 116 may be reduced significantly. At the same time the video quality is not compromised much.

Figure 5:
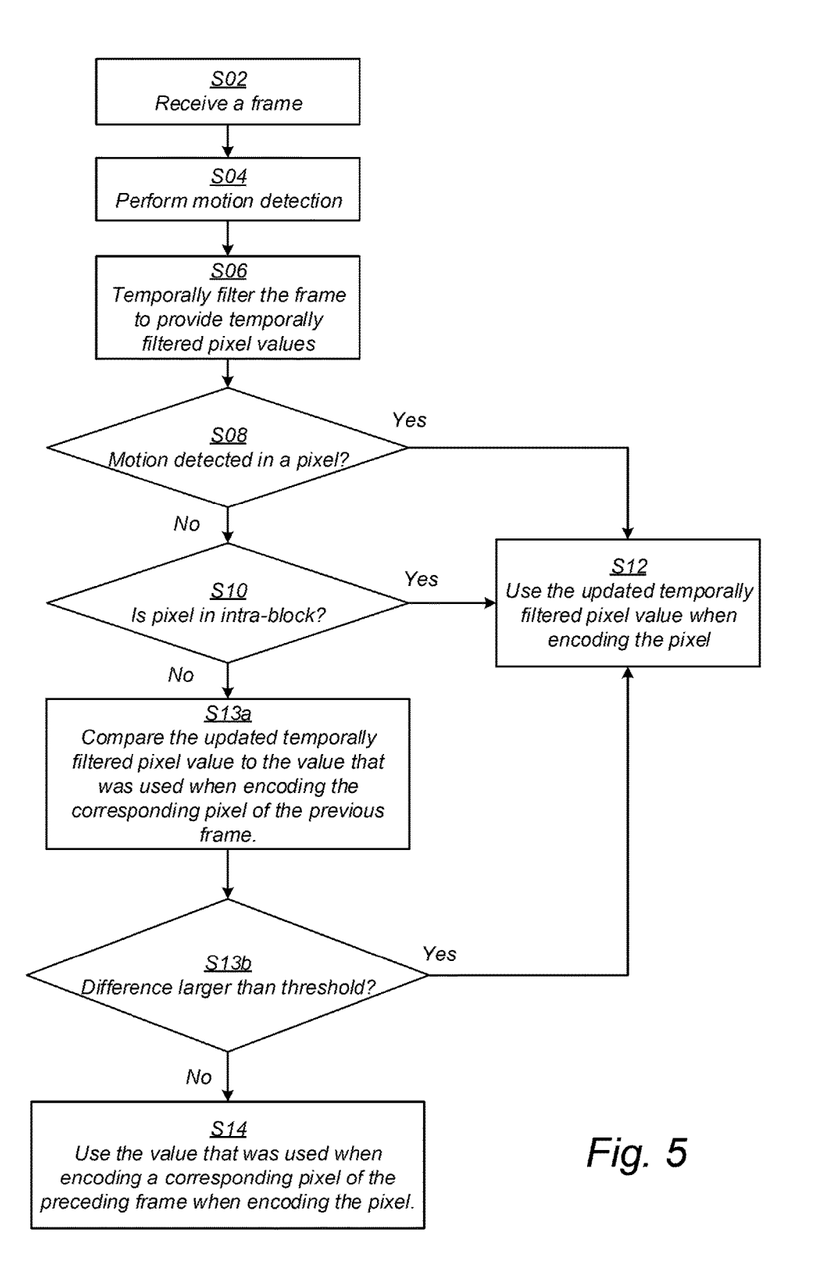
FIG. 5 is a flow chart of a method according to further embodiments.

As time passes by, it may happen that the current output value of the temporal filter 114 starts to deviate from the level at which the value in the pixel is frozen, i.e., from the level corresponding to an old output value of the temporal filter 114. If the deviation becomes too large, the video quality may be compromised, and there may be visual artefacts in the decoded video. FIG. 5 illustrates an embodiment which aims at overcoming this potential problem.

Figure 4:
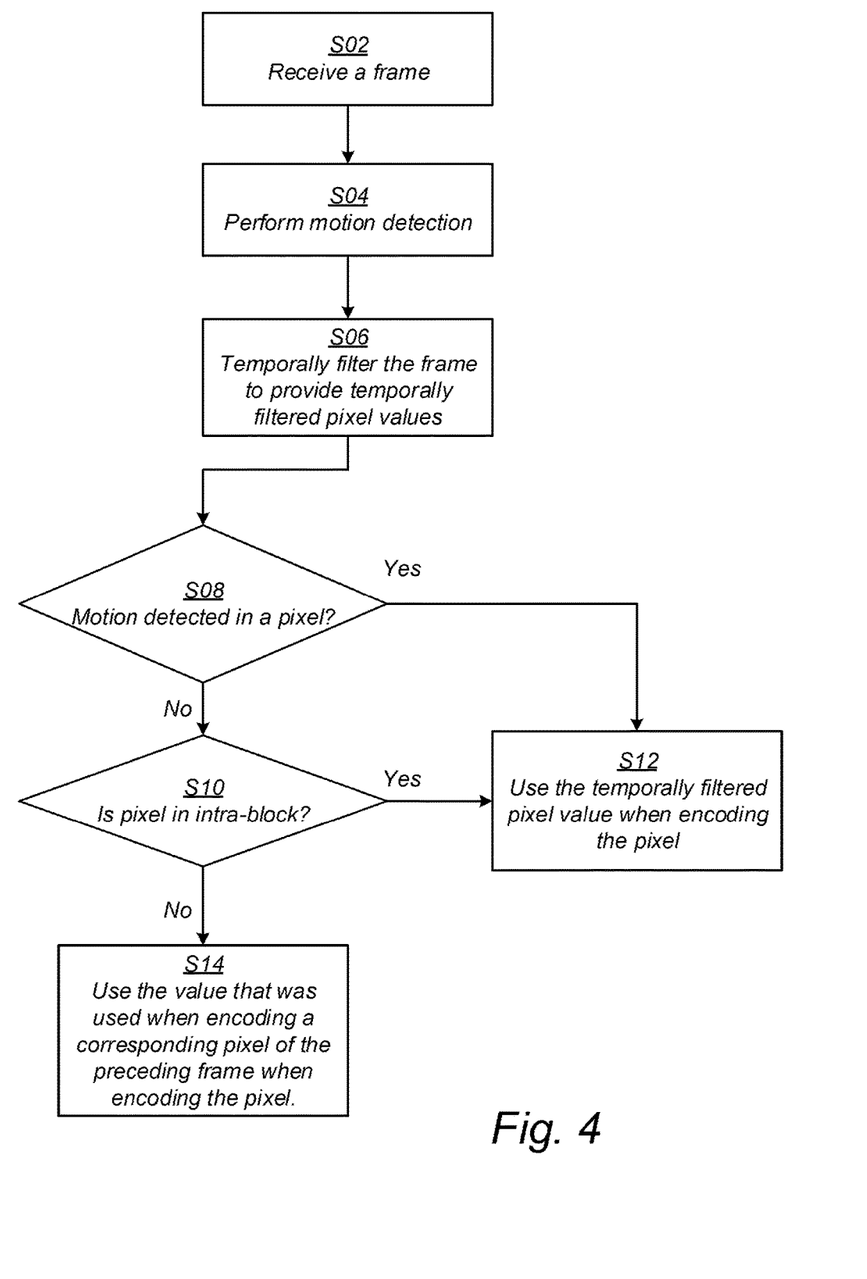
FIG. 4 is a flow chart of a method according to embodiments.

The embodiment of FIG. 5 differs from the embodiment described in conjunction to FIG. 4 in that an additional check is carried out to see whether the frozen value, corresponding to an old output value of the temporal filter 114, deviates too much from the current output value of the temporal filter 114.

In more detail, for pixels which belong to a steady region of the frame, and for pixels which belong to a block of pixels that will be inter-coded, the encoder 116 compares, in step S13a, the temporally filtered pixel value to the value that was used when encoding the corresponding pixel of the previous frame. In other words, the encoder 116 compares the current output of the temporal filter 114 to the value that was used when encoding the previous frame, i.e., the "frozen" level. Referring to FIG. 3, the encoder 116 will thus at time t−1, compare the temporally filtered pixel value 304b, to the value 306a used when encoding the pixel in the previous frame. Expressed in formulas, the encoder 116 thus compares $X_{t−1}$ to $Z_{t−2}$. By way of construction, $Z_{t−2}=X_{t−2}$, so in practice this means that the encoder 116 compares $X_{t−1}$ to $X_{t−2}$.

If the encoder 116 in step S13b finds that the difference between the temporally filtered pixel value 304b and the value 306a that was used when encoding the previous frame is below or equal to a predefined threshold, it uses the value 306a that was used when encoding the corresponding pixel in the previous frame. Thus, in that case the outcome is the same as in the FIG. 4 embodiment.

However, if the encoder 116 in step S13b finds that the difference is above the threshold, the encoder 116 instead uses the temporally filtered pixel value 304b. In this way, the value used when encoding the pixel may be frozen at a new level even in between intra-coded blocks.

The threshold may be set empirically by running the encoding on test video streams and see which value of the threshold results in an acceptable video quality. The threshold may also be used as a tuning parameter depending on the available bandwidth. If the bandwidth is very limited, a high value of the threshold may be set (which, in the limit, is equivalent to using the FIG. 4 embodiment), while if more bandwidth is available, a lower value of the threshold may be selected. In this way, a desired trade-off between bandwidth and video quality may be achieved.

It will be appreciated that a person skilled in the art can modify the above-described embodiments in many ways and still use the advantages of the present teachings as shown in the embodiments above. For example, the present teachings can be used for different applications, such as video conference or sport digital video. It is also understood that the present teachings can be used with any encoding scheme using a GOP structure with intra- and inter encoding, e.g. H.264, H.265 and VPX. Thus, the present teachings should not be limited to the shown embodiments but should only be defined by the appended claims. Additionally, as the skilled person understands, the shown embodiments may be combined.

What is claimed is:

1. A method of encoding a video stream, comprising:
receiving a frame of a video stream to be encoded;
performing motion detection in the frame to identifying steady regions, wherein the steady regions are regions in the frame where no motion is detected;
temporally filtering the frame so as to provide a temporally filtered pixel value for each pixel in the frame;
for each pixel that is not in the steady regions of the frame:
using the temporally filtered pixel value as input value when encoding the pixel; and
for each pixel in the steady regions of the frame:
on a condition that the pixel belongs to a block of pixels of the frame that will be intra-coded, using the temporally filtered pixel value as input value when encoding the pixel, and
on a condition that the pixel belongs to a block of pixels of the frame that will be inter-coded, using, as input value when encoding the pixel, a value that was used as input value when encoding a corresponding pixel of an immediately preceding frame.

2. The method of claim 1, further comprising receiving information indicating whether a block of pixels of the frame will be intra-coded or inter-coded.

3. The method of claim 2, wherein the information includes a group of pictures, GOP, structure that identifies which frames in the video stream that will be encoded as intra-frames and which frames in the video stream that will be encoded as inter-frames, wherein all blocks of pixels in an intra-frame will be intra-coded.

4. The method of claim 3, wherein the information further includes a pattern identifying which blocks of pixels of the inter-frames of the GOP structure that will be intra-coded and which blocks of pixels of the inter-frames of the GOP structure that will be inter-coded.

5. The method of claim 2, wherein the information includes a request that the frame is encoded as an intra-frame.

6. The method of claim 1, further comprising:
for each pixel in the steady regions of the frame:
comparing the temporally filtered pixel value to the value that was used as input value when encoding a corresponding pixel of the immediately preceding frame; and
on a condition that the temporally filtered pixel value differs from the value that was used as input value when encoding a corresponding pixel of the immediately preceding frame by more than a threshold value, using the temporally filtered pixel value as input value when encoding the pixel even if the pixel belongs to a block of pixels of the frame that will be inter-coded.

7. The method of claim 1, further comprising storing the temporally filtered pixel value and the value used as input value when encoding the pixel.

8. The method of claim 1, wherein the step of temporally filtering the frame comprises updating, for each pixel in the frame, a temporally filtered pixel value that was calculated with respect to the immediately preceding frame of the video stream by forming a weighted average of the temporally filtered pixel value that was calculated with respect to the immediately preceding frame and the value of the pixel of the frame.

9. A video encoder, comprising:
a receiver configured to receive a frame of a video stream to be encoded;
a motion detector configured to perform motion detection in the frame to identifying steady regions, wherein the steady regions are regions in the frame where no motion is detected;
a temporal filter configured to temporally filter the frame so as to provide a temporally filtered pixel value for each pixel in the frame; and
an encoder configured to:
for each pixel that is not in the steady regions of the frame, use the temporally filtered pixel value as input value when encoding the pixel, and
for each pixel in the steady regions of the frame, use the temporally filtered pixel value as input value when encoding the pixel on a condition that the pixel belongs to a block of pixels of the frame that will be intra-coded by the encoder, and to use as input value when encoding the pixel a value that was used as input value when encoding a corresponding pixel of an immediately preceding frame on a condition that the pixel belongs to a block of pixels of the frame that will be inter-coded by the encoder.

10. A video camera comprising a video encoder, the video encoder comprising:
a receiver configured to receive a frame of a video stream to be encoded;
a motion detector configured to perform motion detection in the frame to identifying steady regions, wherein the steady regions are regions in the frame where no motion is detected;
a temporal filter configured to temporally filter the frame so as to provide a temporally filtered pixel value for each pixel in the frame; and
an encoder configured to:
for each pixel that is not in the steady regions of the frame, use the temporally filtered pixel value as input value when encoding the pixel, and
for each pixel in the steady regions of the frame, use the temporally filtered pixel value as input value when encoding the pixel on a condition that the pixel belongs to a block of pixels of the frame that will be intra-coded by the encoder, and to use as input value when encoding the pixel a value that was used as input value when encoding a corresponding pixel of an immediately preceding frame on a condition that the pixel belongs to a block of pixels of the frame that will be inter-coded by the encoder.

11. A non-transitory computer-readable medium having instructions stored thereon for encoding a video stream, execution of which by a computing device causes the computing device to perform operations comprising:
receiving a frame of a video stream to be encoded;
performing motion detection in the frame to identifying steady regions, wherein the steady regions are regions in the frame where no motion is detected;
temporally filtering the frame so as to provide a temporally filtered pixel value for each pixel in the frame;
for each pixel that is not in the steady regions of the frame:
using the temporally filtered pixel value as input value when encoding the pixel; and
for each pixel in the steady regions of the frame:
on a condition that the pixel belongs to a block of pixels of the frame that will be intra-coded, using the temporally filtered pixel value as input value when encoding the pixel, and
on a condition that the pixel belongs to a block of pixels of the frame that will be inter-coded, using, as input value when encoding the pixel, a value that was used as input value when encoding a corresponding pixel of an immediately preceding frame.

* * * * *

UNITED STATES PATENT AND TRADEMARK OFFICE
CERTIFICATE OF CORRECTION

PATENT NO.        : 10,382,780 B2
APPLICATION NO.   : 15/928798
DATED             : August 13, 2019
INVENTOR(S)       : Öhrn et al.

Page 1 of 1

It is certified that error appears in the above-identified patent and that said Letters Patent is hereby corrected as shown below:

In the Claims

In Claim 1, at Column 10, Line 39, after the words "frame to", delete "identifying" and insert therefor --identify--.

In Claim 9, at Column 11, Line 35, after the words "frame to", delete "identifying" and insert therefor --identify--.

In Claim 10, at Column 12, Line 9, after the words "frame to", delete "identifying" and insert therefor --identify--.

In Claim 11, at Column 12, Line 33, after the words "frame to", delete "identifying" and insert therefor --identify--.

Signed and Sealed this
Nineteenth Day of November, 2019

Andrei Iancu
*Director of the United States Patent and Trademark Office*